US011901613B2

(12) United States Patent
Ai et al.

(10) Patent No.: US 11,901,613 B2

(45) Date of Patent: Feb. 13, 2024

(54) LOW FREQUENCY BAND RADIATING ELEMENT FOR MULTIPLE FREQUENCY BAND CELLULAR BASE STATION ANTENNA

(71) Applicant: CommScope Technologies LLC, Hickory, NC (US)

(72) Inventors: Bin Ai, Suzhou (CN); Cheng Xue, Suzhou (CN); Fusheng Lv, Suzhou (CN); Lei Yang, Suzhou (CN)

(73) Assignee: CommScope Technologies LLC, Claremont, NC (US)

( * ) Notice: Subject to any disclaimer, the term of this patent is extended or adjusted under 35 U.S.C. 154(b) by 147 days.

(21) Appl. No.: 17/238,247

(22) Filed: Apr. 23, 2021

(65) Prior Publication Data

US 2021/0367328 A1 Nov. 25, 2021
US 2023/0411833 A9 Dec. 21, 2023

(30) Foreign Application Priority Data

May 20, 2020 (CN) ........................ 202010428521.2

(51) Int. Cl.

| | |
|---|---|
| ***H01Q 1/24*** | (2006.01) |
| ***H01Q 5/307*** | (2015.01) |
| ***H01Q 21/26*** | (2006.01) |
| ***H01Q 5/42*** | (2015.01) |
| ***H01Q 19/10*** | (2006.01) |

(52) U.S. Cl.

CPC ............. *H01Q 1/246* (2013.01); *H01Q 5/307* (2015.01); *H01Q 5/42* (2015.01); *H01Q 19/108* (2013.01); *H01Q 21/26* (2013.01)

(58) Field of Classification Search

CPC .......... H01Q 1/246; H01Q 5/307; H01Q 5/42; H01Q 19/108; H01Q 21/26

See application file for complete search history.

(56) References Cited

U.S. PATENT DOCUMENTS

| | | | | |
|---|---|---|---|---|
| 10,770,803 | B2 | 9/2020 | Varnoosfaderani et al. | |
| 2007/0241983 | A1* | 10/2007 | Cao ........................ | H01Q 21/26 343/797 |
| 2018/0323513 | A1 | 11/2018 | Varnoosfaderani et al. | |
| 2020/0067197 | A1 | 2/2020 | Tang et al. | |

FOREIGN PATENT DOCUMENTS

| | | | |
|---|---|---|---|
| CN | 209487703 | U | 10/2019 |
| CN | 111063984 | A * | 4/2020 |
| CN | 111063984 | A | 4/2020 |

OTHER PUBLICATIONS

"Extended European Search Report for European Application No. 21172833.2, dated Oct. 27, 2021, 8 pages".

* cited by examiner

*Primary Examiner* — Ricardo I Magallanes
*Assistant Examiner* — Amal Patel
(74) *Attorney, Agent, or Firm* — Myers Bigel, P.A.

(57) ABSTRACT

A low frequency band radiating element for a multiple frequency band cellular base station antenna comprises a dipole arm including a radiating portion and a first coupling portion and a dipole leg that includes a leg and a second coupling portion located at one end of the leg. The first coupling portion is removably connected to the second coupling portion. A thin metal sheet with a suitable electrical performance can be selected for the dipole arm, and a thick metal plate can be selected for a dipole leg so as to achieve mechanical strength.

5 Claims, 13 Drawing Sheets

LOW FREQUENCY BAND RADIATING ELEMENT FOR MULTIPLE FREQUENCY BAND CELLULAR BASE STATION ANTENNA

CROSS-REFERENCE TO RELATED APPLICATION

The present application claims priority to Chinese Patent Application No. 202010428521.2, filed May 21, 2020, the entire content of which is incorporated herein by reference as if set forth fully herein.

FIELD

The present disclosure generally relates to the field of cellular base station antennas, and more particularly to low frequency band radiating elements for multiple frequency band cellular base station antennas.

BACKGROUND

The cellular communication system connects a user's cellular device to a wireless network through a base station. The base station includes one or more baseband units, radios, and antennas that perform bi-directional radio frequency communication with users. The base station antennas can be installed on a tower or other elevated structures, and generate outward radiation beams to serve a corresponding geographic area.

A multiple frequency band base station antenna is a base station antenna that is designed to operate in two or more cellular frequency bands. The use of a multiple frequency band antenna enables an operator of a cellular communication system to use a single type of antenna to cover multiple frequency bands. This allows the operator to reduce the number of antennas in their network, thereby reducing the rental cost of towers and accelerating the marketability at the same time. The multiple frequency band cellular base station antenna supports multiple frequency bands and technical standards. The multiple frequency band cellular base station antenna at least includes one or more low frequency band radiating elements and one or more high frequency band radiating elements. A known low frequency band radiating element has a center feed and a pair of center fed low frequency dipoles. The existing low frequency dipoles are generally made from sheet metal or using printed circuit boards (PCB). The sheet metal low frequency dipoles are usually integrally formed of stamped sheet metal. However, such integrally formed low frequency dipoles may have various shortcomings. For example, it is necessary to use a relatively large-sized stamping machine to produce these low frequency dipoles, so that the fabrication cost and the material cost are relatively high. In addition, considering a balance between the overall mechanical strength and the electrical performance of the low frequency dipoles, the dipole arm cannot be made too thin. The center feed and the low frequency dipoles are fixed together during assembly by, for example, soldering the dipoles to a PCB feed stalk that includes the center feed. When one of the low frequency dipoles needs to be replaced, both low frequency dipoles and the center feed have to be removed from the solder joints on the PCB, which not only increases the number of operation steps, but also may damage the assembly.

SUMMARY

A first aspect of the present disclosure relates to a low frequency band radiating element for a multiple frequency band cellular base station antenna, wherein the low frequency band radiating element includes a dipole arm including a radiating portion and a first coupling portion adjacent each other and a dipole leg that includes a leg and a second coupling portion located at one end of the leg, where the first coupling portion is connected to the second coupling portion in a removable manner.

In some embodiments, the dipole leg is a stamped sheet metal dipole leg.

In some embodiments, the dipole leg comprises aluminum.

In some embodiments, the dipole leg has a thickness of 0.8 mm to 1.2 mm.

In some embodiments, the dipole leg has a thickness of about 1 mm.

In some embodiments, the second coupling portion protrudes radially outward from the one end of the leg.

In some embodiments, the dipole leg further includes a grounded portion protruding radially outward from the other end of the leg opposite to the one end, and configured to solder the dipole leg to a printed circuit board of the base station antenna.

In some embodiments, the first coupling portion and the second coupling portion substantially correspond to each other in shape.

In some embodiments, a shape of the first coupling portion and a shape of the second coupling portion are selected from a group consisting of trapezoid, rectangle, triangle, and semicircle.

In some embodiments, the first coupling portion is connected to the second coupling portion by rivets.

In some embodiments, the dipole arm comprises a stamped sheet metal dipole arm.

In some embodiments, the dipole arm comprises aluminum or stainless steel.

In some embodiments, the dipole arm has a thickness of 0.3 mm to 0.6 mm.

In some embodiments, the radiating portion is provided with an open pattern.

In some embodiments, the dipole leg has a thickness greater than that of the dipole arm.

In some embodiments, the low frequency band radiating element further includes a dielectric spacer interposed between the first coupling portion and the second coupling portion.

In some embodiments, the dipole arm is made from a printed circuit board.

A second aspect of the present disclosure relates to a low frequency band radiating element for a multiple frequency band cellular base station antenna, wherein the low frequency band radiating element includes a center feed, a plurality of dipole arms, each dipole including a radiating portion and a first coupling portion that is adjacent the radiating portion, a plurality of dipole legs that are arranged to surround the center feed, each dipole leg including a leg and a second coupling portion that is located at one end of the leg, and a support structure configured to support the center feed and the plurality of dipole arms on a printed circuit board of the base station antenna, where the first coupling portion of each dipole arm is removably connected to the second coupling portion of a respective one of the dipole legs.

In some embodiments, each dipole leg comprises a stamped sheet metal dipole leg.

In some embodiments, the dipole legs comprise aluminum.

In some embodiments, each dipole leg has a thickness of 0.8 mm to 1.2 mm.

In some embodiments, dipole leg has a thickness of about 1 mm.

In some embodiments, each second coupling portion protrudes radially outward from the one end of the leg.

In some embodiments, each dipole leg further includes a grounded portion protruding radially outward from the other end of the leg opposite to the one end, and configured to solder the dipole leg to a printed circuit board of the base station antenna.

In some embodiments, each first coupling portion substantially corresponds in shape to a respective one of the second coupling portions.

In some embodiments, shapes of the first coupling portions and shapes of the second coupling portions are selected from a group consisting of trapezoid, rectangle, triangle, and semicircle.

In some embodiments, each first coupling portion is connected together with a respective one of the second coupling portions by rivets.

In some embodiments, the center feed includes metal feed lines and a securing block for securing the feed lines, and the dipole legs abut against respective outer sidewalls of the securing block.

In some embodiments, each dipole arm comprises a stamped sheet metal dipole arm.

In some embodiments, each dipole arm comprises aluminum or stainless steel.

In some embodiments, each dipole arm has a thickness of 0.3 mm to 0.6 mm.

In some embodiments, the radiating portion of each dipole arm has an open pattern.

In some embodiments, each dipole leg has a thickness greater than that of the dipole arm to which it is connected.

In some embodiments, it further comprising a dielectric spacer interposed between at least one of the first coupling portions and a corresponding one of the second coupling portions.

In some embodiments, at least one of the dipole arms is made from a printed circuit board.

In some embodiments, the support structure includes a plurality of support legs and a plurality of corresponding support arms arranged around a central through hole thereof.

In some embodiments, each support arm is disposed at a top end of a respective one of the support legs and protrudes radially outward therefrom.

In some embodiments, each support arm is provided with a receiving portion configured to receive a radiating portion of a respective one of the dipole arms.

In some embodiments, a contour shape of the receiving portion substantially corresponds to and is slightly larger than an outer contour shape of the radiating portion.

In some embodiments, each dipole arm comprises a stamped sheet metal dipole arm, and the low frequency band radiating element further includes a dielectric spacer interposed between each first coupling portion and its corresponding second coupling portion, wherein the support arm is disposed on a radially inner side of the receiving portion with a sink portion recessed inwardly from a bottom surface of the receiving portion, and the sink portion is configured to receive the second coupling portions and at least a portion of the dielectric spacer.

In some embodiments, a depth of the sink portion substantially corresponds to a sum of the thicknesses of the second coupling portion and the dielectric spacer.

In some embodiments, the sink portions of the plurality of support arms are arranged around the central through hole such that a combined contour shape of the sink portions substantially corresponds to an outer contour shape of the dielectric spacer.

In some embodiments, the dipole arm is made from a printed circuit board, wherein the support arm is provided on a radially inner side of the receiving portion with a sink portion recessed inwardly from a bottom surface of the receiving portion, and the sink portion is configured to receive the second coupling portion.

In some embodiments, a depth of the sink portion substantially corresponds to a thickness of the second coupling portion.

In some embodiments, the support structure further includes covers that are placed on the supporting arms and removably fixed to the supporting arms.

In some embodiments, an outer contour shape of the cover substantially corresponds to that of the support arm.

In some embodiments, the radiating portions of each dipole arm are arranged to be the same as each other.

In some embodiments, the radiating portion of at least one of the dipole arms is different from a radiating portion of another of the dipole arms.

A third aspect of the present disclosure relates to a multiple frequency band cellular base station antenna, wherein the base station antenna includes a reflector, and an array of low frequency band radiating elements provided on the reflector, wherein the array of low frequency band radiating elements includes at least one low frequency band radiating element according to the above description.

DETAILED DESCRIPTION

Figure 1:
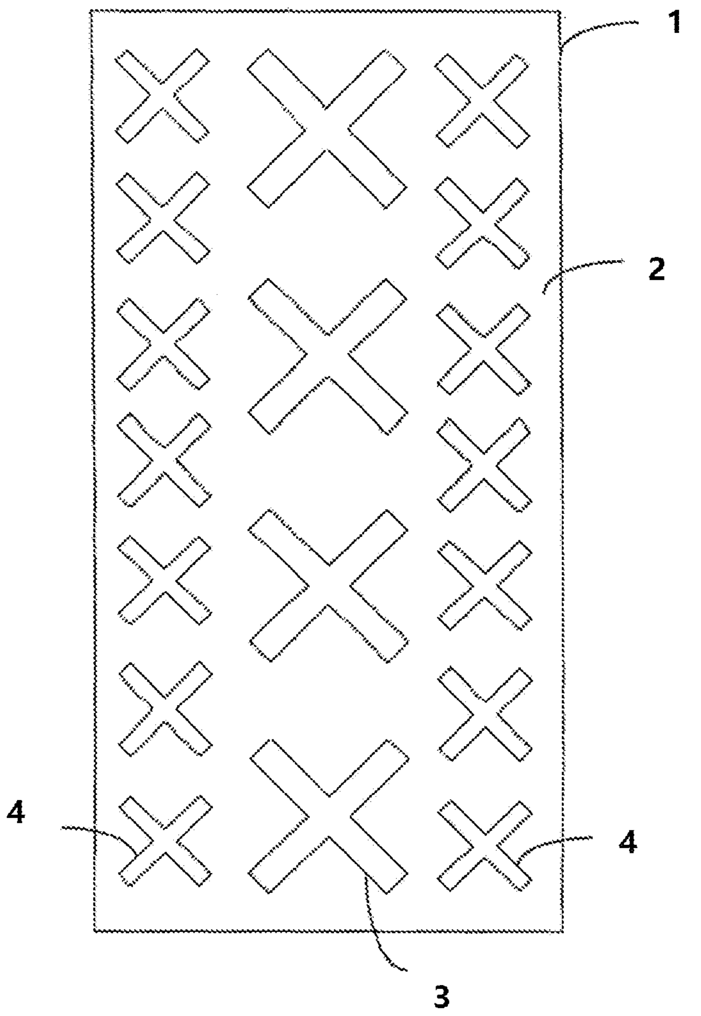
FIG. 1 is a partial schematic diagram of a multiple frequency band cellular base station antenna according to an embodiment of the present disclosure.

The present disclosure will be described below with reference to the accompanying drawings, in which several embodiments of the present disclosure are shown. It should be understood, however, that the present disclosure may be presented in multiple different ways, and not limited to the embodiments described below. In fact, the embodiments described hereinafter are intended to make a more complete disclosure of the present disclosure and to adequately explain the protection scope of the present disclosure to a person skilled in the art. It should also be understood that, the embodiments disclosed herein can be combined in various ways to provide more additional embodiments.

It should be understood that, in all the accompanying drawings, the same reference signs present the same elements. In the drawings, for the sake of clarity, the sizes of certain features may be deformed.

It should be understood that, the wording in the specification is only used for describing particular embodiments and is not intended to define the present disclosure. All the terms used in the specification (including the technical terms and scientific terms), have the meanings as normally understood by a person skilled in the art, unless otherwise defined. For the sake of conciseness and/or clarity, the well-known functions or constructions may not be described in detail any longer.

The singular forms "a/an", "said" and "the" as used in the specification, unless clearly indicated, all contain the plural forms. The wordings "comprising", "containing" and "including" used in the specification indicate the presence of the claimed features, but do not repel the presence of one or more other features. The wording "and/or" as used in the specification includes any and all combinations of one or more of the relevant items listed. The phases "between X and Y" and "between about X and Y" as used in the specification should be construed as including X and Y. The phrase "between about X and Y" as used in the present specification means "between about X and about Y", and the phrase "from about X to Y" as used in the present specification means "from about X to about Y".

In the specification, when one element is referred to as being "on" another element, "attached to" another element, "connected to" another element, "coupled to" another element, or "in contact with" another element, the element may be directly located on another element, attached to another element, connected to another element, coupled to another element, or in contact with another element, or there may be present with an intermediate element. By contrast, where one element is referred to as being "directly" on another element, "directly attached to" another element, "directly connected to" another element, "directly coupled to" another element, or "in direct contact with" another element, there will not be present with an intermediate element. In the specification, where one feature is arranged to be "adjacent" to another feature, it may mean that one feature has a portion that overlaps with an adjacent feature or a portion that is located above or below an adjacent feature.

In the specification, the spatial relation wordings such as "up", "down", "left", "right", "forth", "back", "high", "low" and the like may describe a relation of one feature with another feature in the drawings. It should be understood that, the spatial relation wordings also contain different orientations of the apparatus in use or operation, in addition to containing the orientations shown in the drawings. For example, when the apparatus in the drawings is overturned, the features previously described as "below" other features may be described to be "above" other features at this time. The apparatus may also be otherwise oriented (rotated 90 degrees or at other orientations). At this time, the relative spatial relations will be explained correspondingly.

Embodiments of the present disclosure generally relate to low frequency band radiating elements for multiple frequency band cellular base station antennas. The following description will disclose a number of specific details including the shape and material of the dipole arms and dipole legs included in these radiating elements, as well as the dielectric material and the like. However, it should be clear to those skilled in the art that various modified solutions and/or alternative solutions may be set forth for the aforementioned details without departing from the scope and spirit of the present disclosure, and certain details may also be omitted.

In some embodiments, the low frequency band may refer to a frequency band such as 698 to 960 MHz or a part thereof, and the high frequency band may refer to a frequency band such as 1695 to 2690 MHz or a part thereof. However, the present disclosure is not limited to these frequency bands. For example, the low frequency band may also include a low frequency such as 600 MHz (e.g., the 617-960 MHz band or a portion thereof), and/or the high frequency band may also include a high frequency such as 1400 MHz (e.g., the 1427-2690 MHz frequency band or a portion thereof). The "low frequency band radiating element" refers to a radiating element configured to operate in a low frequency band, and the "high frequency band radiating element" refers to a radiating element configured to operate in a high frequency band. Throughout the present disclosure, "multiple frequency band" at least includes one low frequency band and one high frequency band. It should also be understood that the term "multiple frequency band antenna" refers not only to an antenna operating in a low frequency band and a high frequency band, but also to an antenna operating in one or more additional frequency bands (e.g., a frequency band of 3.5 GHz or a frequency band of 5 GHz).

FIG. 1 is a schematic view of a part of a multiple frequency band cellular base station antenna 1. The multiple frequency band cellular base station antenna 1 includes a reflector 2, arrays of low frequency band radiating elements 3, and arrays of high frequency band radiating elements 4. The arrays of low frequency band radiating elements 3 and the arrays of high frequency band radiating elements 4 are both disposed on the reflector 2. In the example shown, the low frequency band radiating elements 3 and the high frequency band radiating elements 4 are arranged to be vertical arrays of low frequency band radiating elements and high frequency band radiating elements. The radiating elements in each vertical array may be spaced apart from each other by approximately half a wavelength in the vertical direction. However, it should be clear that the low frequency band radiating elements 3 and the high frequency band radiating elements 4 may also be arranged in arrays having other patterns.

Figure 2:
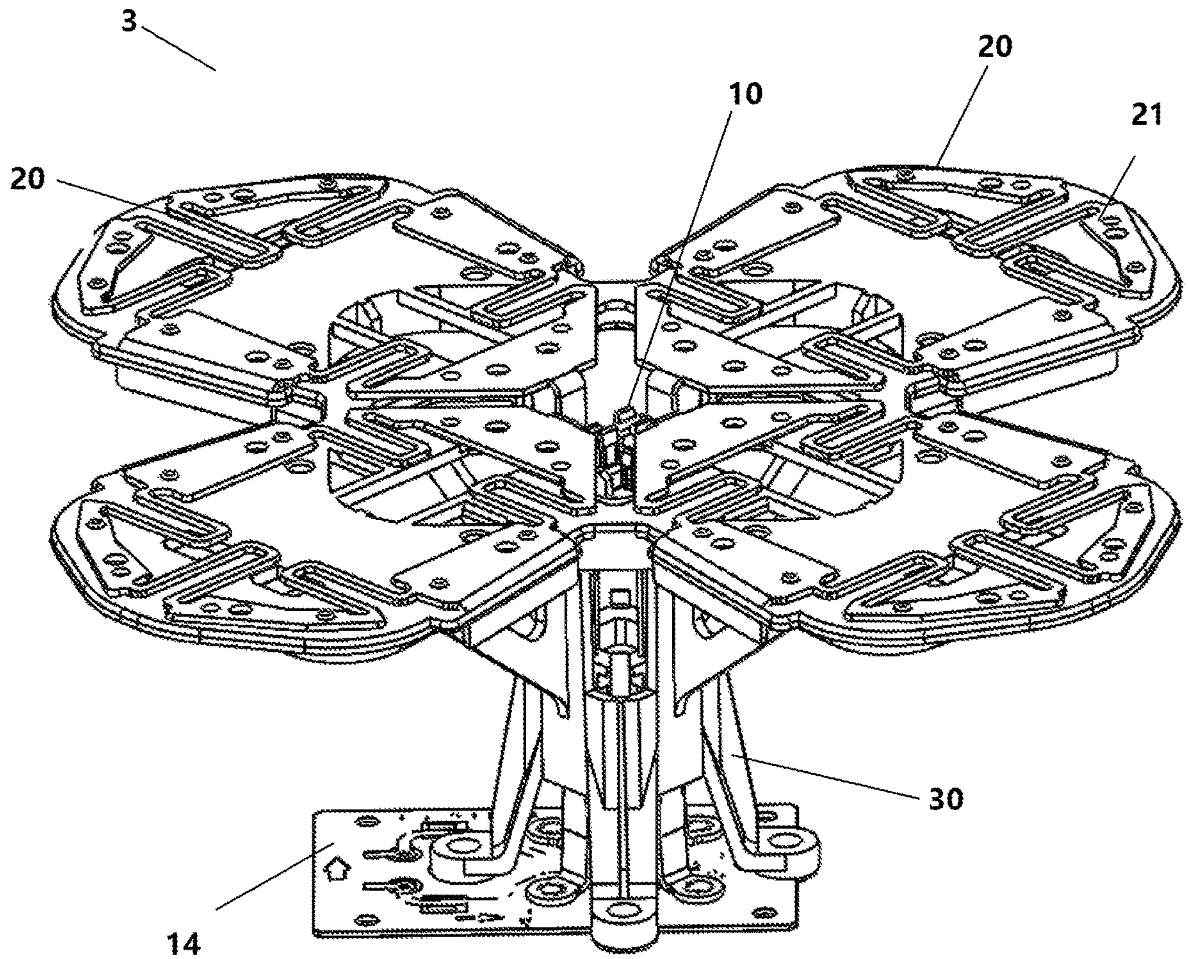
FIG. 2 shows a perspective view of a low frequency band radiating element according to a first embodiment of the present disclosure.

FIG. 2 is a perspective view of a low frequency band radiating element 3 according to the first embodiment of the present disclosure. As shown, the low frequency band radiating element 3 may include a center feed 10 and two low frequency dipoles 20. The two low frequency dipoles 20 surround the center feed 10 and are orthogonal to each other. The low frequency band radiating element 3 may further include a support 30 for supporting the center feed 10 and the two low frequency dipoles 20. The support 30 surrounds the center feed 10 and supports the center feed 10 and the two low frequency dipoles 20 on a PCB 14 above the reflector 2.

Figure 3:
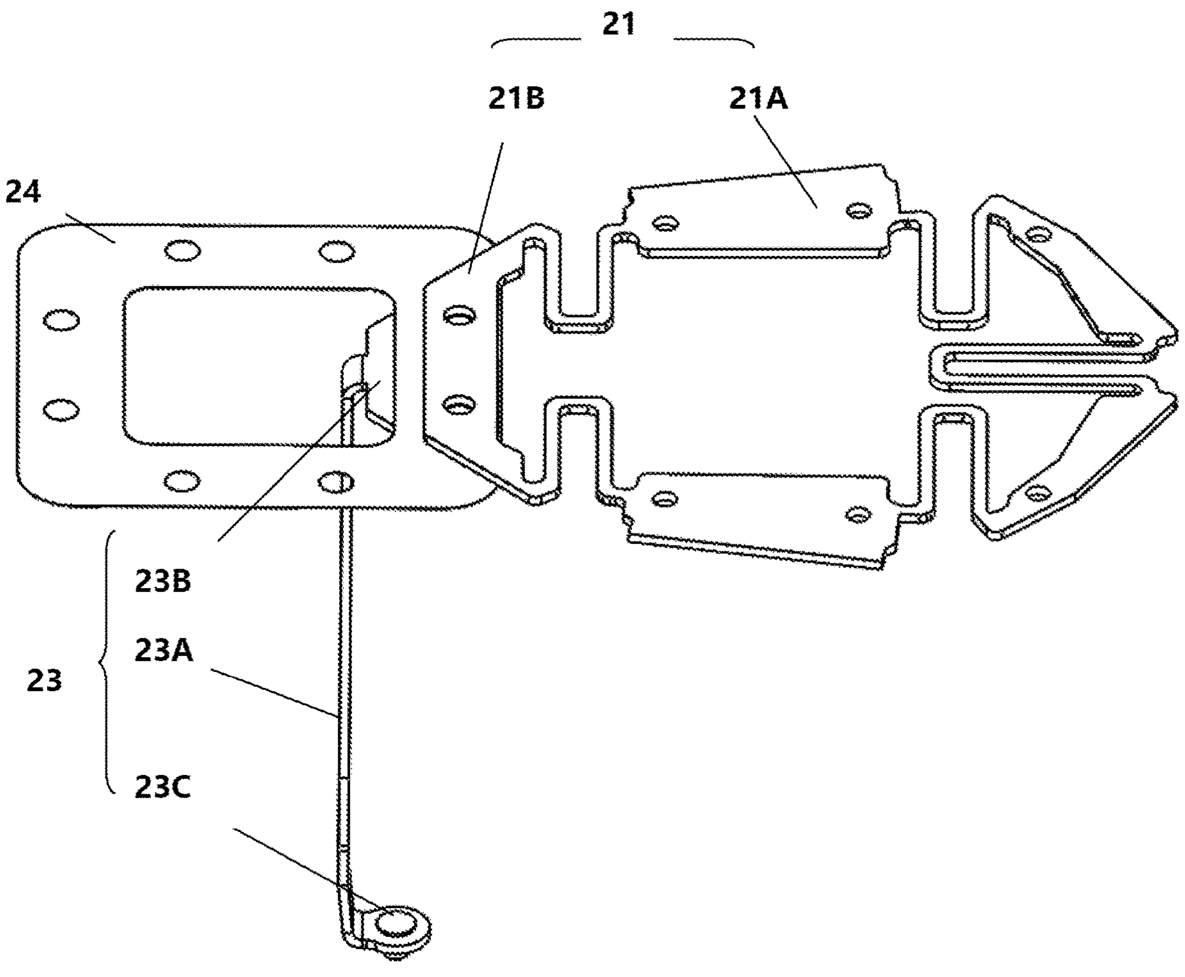
FIG. 3 shows a perspective view of a dipole arm and a dipole leg of the low frequency band radiating element of FIG. 2.

Each low frequency dipole 20 includes two low frequency dipole arms 21 that are arranged at 180 degrees (i.e., the two dipole arms 21 extend along a common axis). As shown in FIG. 3, each low frequency dipole arm 21 is removably connected to a separate dipole leg 23. Herein, two elements are "removably connected" to each other if they are designed to be readily attached and detached from each other, without damage, using connectors such as screws, rivets, snap-clips or the like. The low frequency band radiating element 3 comprises a total of four low frequency dipole arms 21 (that together form the two dipoles 20) and four dipole legs 23. However, it is appreciated that the low frequency band radiating element 3 may comprise another quantity of low frequency dipoles 20 (e.g., a single dipole 20) or another quantity of low frequency dipole arms 21 (e.g., two dipole arms 21) in other embodiments.

Each dipole leg 23 supports a respective one of the dipole arms 21 at a certain height above the PCB 14. It should be noted that while herein the dipole arms 21 are described as being "above" the PCB 14 and/or the reflector 2 for convenience, when the base station antenna 1 is mounted for use, the reflector 2 will typically extend along a vertical (or almost vertical) axis and the dipole arms 21 will be mounted forwardly of the reflector 2. Each dipole leg 23 has a substantially elongated plate shape. Referring to FIG. 3, each dipole leg 23 includes a leg 23A, a coupling portion 23B and a grounded portion 23C. The leg 23A is arranged to extend substantially perpendicular to the PCB 14. The grounded portion 23C is configured to be grounded and may be soldered to the PCB 14 to mechanically and electrically connect the leg 23A to the PCB 14. The grounded portion 23C has a substantially plate shape, and is located at the bottom end of the leg 23A. The grounded portion 23C protrudes radially outward from the leg 23A in a direction substantially perpendicular to the leg 23A, and is arranged substantially parallel to the PCB 14. The coupling portion 23B is configured to removably connect the dipole leg 23 (e.g., by rivets) to a corresponding dipole arm 21. The coupling portion 23B has a substantially plate shape, and is located at a top end of the leg 23A. The coupling portion 23B extends radially outward from the leg 23A in a direction substantially perpendicular to the leg 23A, and is disposed substantially parallel to the PCB 14. The coupling portion 23B and the grounded portion 23C may be disposed on the same side or different sides of the leg 23A.

The dipole leg 23 may be integrally formed by stamping a metal plate, and made of a metal material such as aluminum. The thickness of the dipole leg 23 may be set to about 0.8 mm to about 1.2 mm (e.g., about 1 mm), thereby providing the dipole leg 23 with sufficient mechanical strength.

Figure 4A:
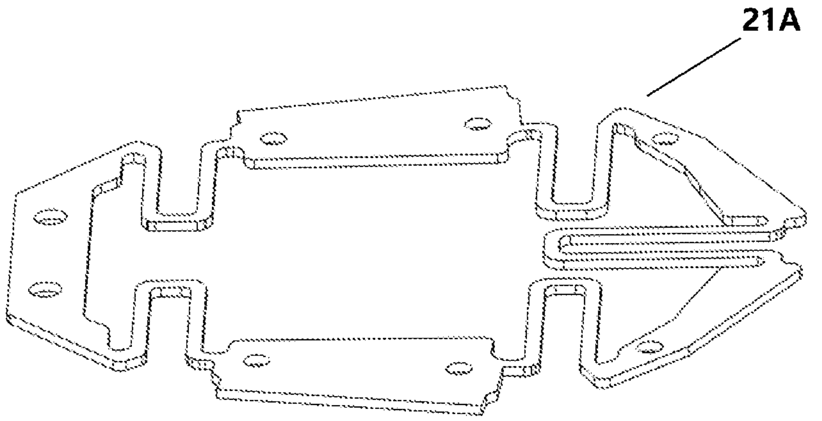
FIGS. 4A-4C are schematic views showing various designs for the radiating portion of the low frequency dipole arm of FIG. 3.
Figure 4B:
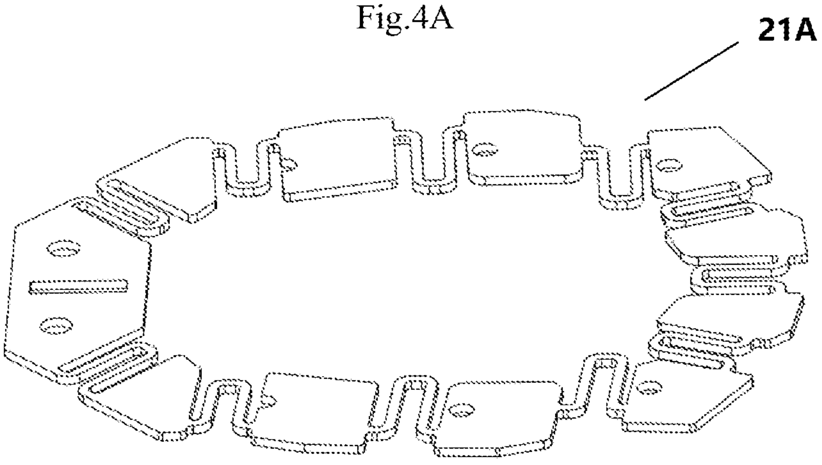
Figure 4C:
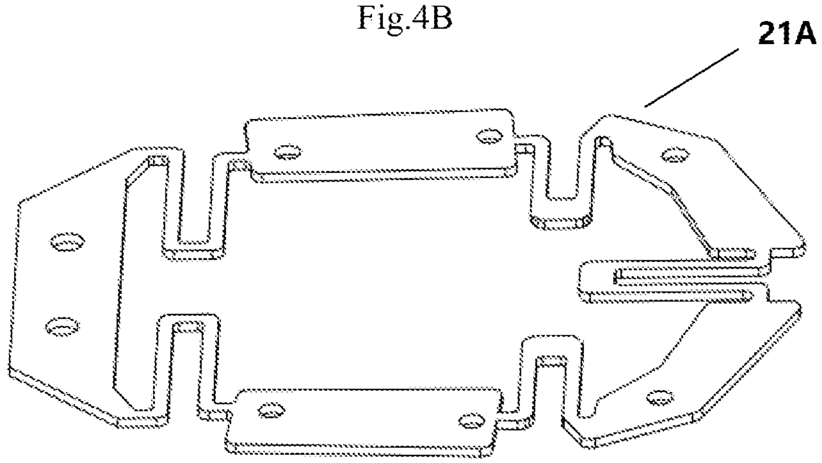

Each dipole arm 21 extends substantially parallel to the PCB 14, and is arranged at a certain height from the PCB 14. Each dipole arm 21 has a substantially flat sheet shape and includes a radiating portion 21A and a coupling portion 21B that are adjacent each other. The radiating portion 21A may have an open pattern and may be used for spatial wave transmission. The radiating portion 21A may have a variety of suitable patterns, as shown in FIGS. 4A-4C. The coupling portion 21B is located radially inward of the radiating portion 21A, and configured to removably connect the dipole arm 21 to a corresponding dipole leg 23. The shapes of the coupling portion 21B and the coupling portion 23B may substantially correspond to each other, and may substantially be, for example, trapezoidal, rectangular, triangular, semicircular, or any other suitable shape. The coupling portion 21B and the coupling portion 23B are provided with a plurality of through holes (e.g., two) corresponding in position for receiving rivets therethrough, so as to fixedly connect the coupling portion 21B to the coupling portion 23B. In other embodiments, the coupling portion 21B and the coupling portion 23B may also be connected together in other connection means, such as screw connection, snap-fit connection, shape fit, etc.

Each dipole arm 21 may be integrally formed by stamping a metal plate, and made of a metal material such as aluminum, stainless steel, or the like. The thickness of each dipole arm 21 may be about 0.3 mm to about 0.6 mm (e.g., about 0.4 mm), thereby providing the dipole arm 21 with a favorable electrical performance. In the present disclosure, the dipole arm 21 and the dipole leg 23 which are formed by stamping separately have different thicknesses. That is, the dipole arm 21 has a thinner thickness, and the dipole leg 23 has a thicker thickness, which seeks a balance between an overall mechanical strength and an electrical performance for the low frequency dipole 20. In addition, the smaller the thickness of the dipole arm 21, the lower the requirements for a stamping machine will be. Moreover, it is possible to produce a more complicated zigzag pattern with a thinner dipole arm 21. In addition, the smaller the thickness of the dipole arm 21, the better the cutting quality of the edge area of the radiating portion 21A will be, so that it is possible to reduce a potential passive intermodulation distortion (PIM) problem that may arise when RF signals are present on metal surfaces having uneven or rough edges.

A dielectric spacer 24 may be interposed between the coupling portion 21B of each dipole arm 21 and the respective coupling portions 23B of the corresponding dipole legs 23, so that the coupling portion 21B and the coupling portion 23B do not directly contact each other but instead are spaced apart from each other by a stable and uniform gap. A single dielectric spacer 24 or multiple dielectric spacers 24 may be provided. The coupling portion 21B of each dipole arm 21 and the coupling portion 23B of its corresponding dipole leg 23 are capacitively coupled to each other through the dielectric spacer 24. The dielectric spacer 24 may be substantially square in example embodiments.

Figure 5:
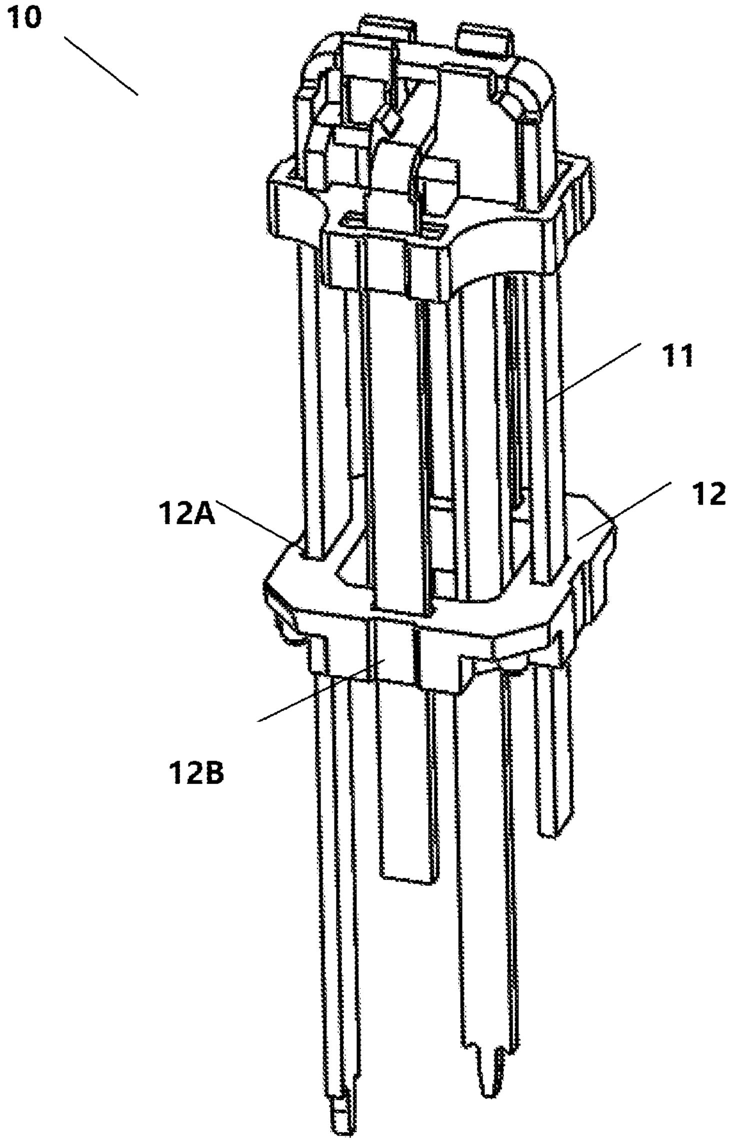
FIG. 5 shows a perspective view of a center feed of the low frequency band radiating element of FIG. 2.

As shown in FIG. 5, the center feed 10 includes metal feed lines 11 and one or more plastic securing blocks 12 for securing the feed lines 11. The feed lines 11 extend along the vertical direction, and the bottom end of each feed line 11 may be connected to the PCB 14 by soldering. The one or more securing blocks 12 may together have a substantially square or octagonal plate shape. The central portion of the securing block 12 has a plurality of through holes 12A for the feed lines 11 to pass therethrough. The dipole legs 23 of the low frequency dipoles 20 may respectively abut against the four opposite outer side walls of the securing blocks 12. In some embodiments, the four opposite side walls are provided with recesses 12B for securing the respective dipole legs 23 in position.

Figure 6A:
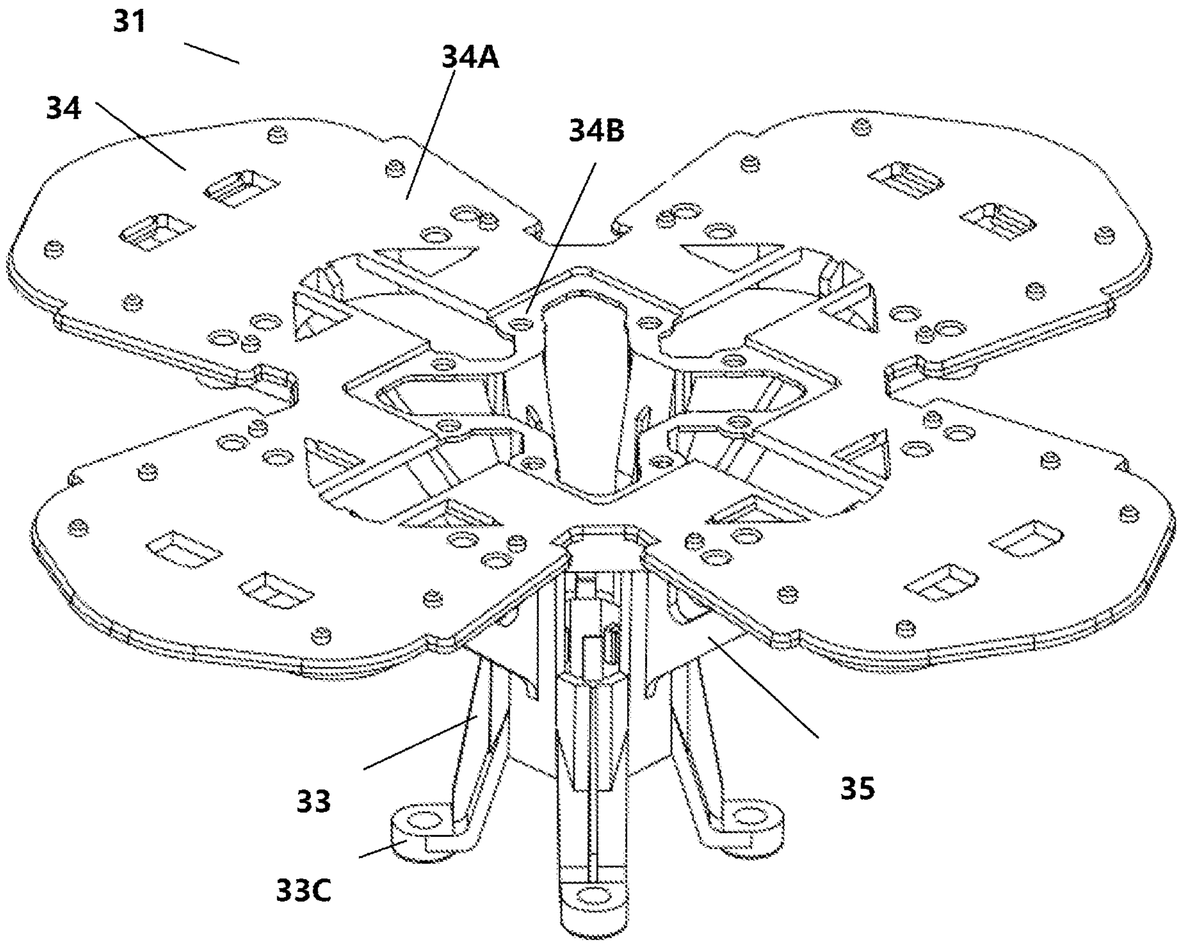
FIGS. 6A-6B show perspective views of a support and a cover of the low frequency band radiating element of FIG. 2.
Figure 6B:
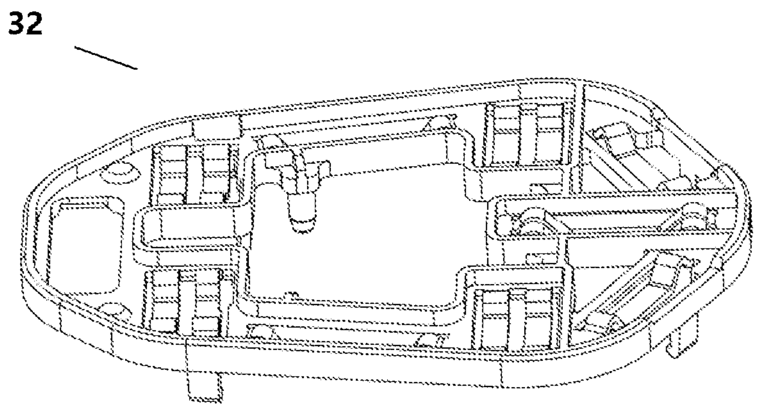

As shown in FIGS. 6A and 6B, the supporting structure 30 includes a support 31 and a cover 32 that are formed separately. The support 31 is configured to support the center feed 10, as well as the dipole arms 21 and the dipole legs 23 of the low frequency dipoles 20. The support 31 includes four support legs 33 and four support arms 34 that are arranged around a central through hole thereof. Each support leg 33 is connected to a corresponding support arm 34, and the four support legs 33 and support arms 34 connected thereto are spaced apart at 90 degrees around the central through hole. Each support leg 33 has an elongated shape, and is arranged to extend substantially perpendicular to the PCB 14. The bottom end of each support leg 33 is provided with a connecting portion 33C that protrudes radially outward for securing the support leg 33 to the PCB 14 by fasteners, such as screws, or other connection mechanisms. The support legs 33 that are adjacent in the circumferential direction are connected together by a bonding plate 35. The securing block 12 of the center feed 10 may rest on the bonding plate 35 and be maintained in position by hooks on the bonding plate 35 to prevent the center feed 10 from moving up and down.

Each support arm 34 is configured to maintain a corresponding one of the dipole arms 21 in its proper position and to connect the dipole arm 21 to its corresponding dipole leg 23. Each support arm 34 is disposed at the top end of its corresponding support leg 33 and protrudes radially outward from the support leg 33 substantially perpendicular to the support leg 33. Each support arm 34 may have a substantially plate-like shape. Each support arm 34 is provided with a receiving portion 34A for receiving the radiating portion 21A of its corresponding dipole arm 21. The contour shape of the receiving portion 34A substantially corresponds to and is slightly larger than the outer contour shape of the radiating portion 21A. Each support arm 34 is provided on a radially inner side of the receiving portion 34A with a sink portion 34B recessed inward from the bottom surface of the receiving portion 34A for receiving the coupling portion 23B of the dipole leg 23 and one side of the dielectric pad 24. The coupling portion 21B of the dipole arm 21 may be placed on the dielectric spacer 24, and the depth of the sink portion 34B may roughly correspond to the sum of the thicknesses of the coupling portion 23B of the dipole leg 23 and the dielectric spacer 24, so that the coupling portion 23B of the dipole leg 23 and the coupling portion 21B of the dipole arm 21 are coupled in a flatly attached manner after the coupling portion 23B of the dipole leg 23 and the dielectric spacer 24 are placed into the sink portion 34B and the dipole arm 21 is placed into the receiving portion 34A, thereby preventing a bend between the radiating portion 21A and the coupling portion 21B. The combined contour shape of the sink portions 34B of the four circumferential support arms 34 substantially corresponds to the outer contour shape of the dielectric spacer 24, and each sink portion 34B receives one side of the dielectric spacer 24 respectively. The sink portion 34B is provided with holes for receiving rivets.

Each cover 32 is placed on a respective one of the support arms 34, and covers the receiving portion 34A and the sink portion 34B of the support arm 34. The cover 32 is configured to protect the dipole arm 21 from external damage and to ensure that the dipole arm 21 (especially the coupling portion 21B) is attached in a flat manner. The outer contour shape of the cover 32 substantially corresponds to that of the support arm 34. The cover 32 may be removably fixed to the support arm 34 by snap-fitting or the like.

The support structure 30 may be, for example made from plastic. The support 31 of the support structure 30 may be integrally formed, or separately formed and connected together. The covers 32 of the support structure 30 may be integrally formed.

Figure 7A:
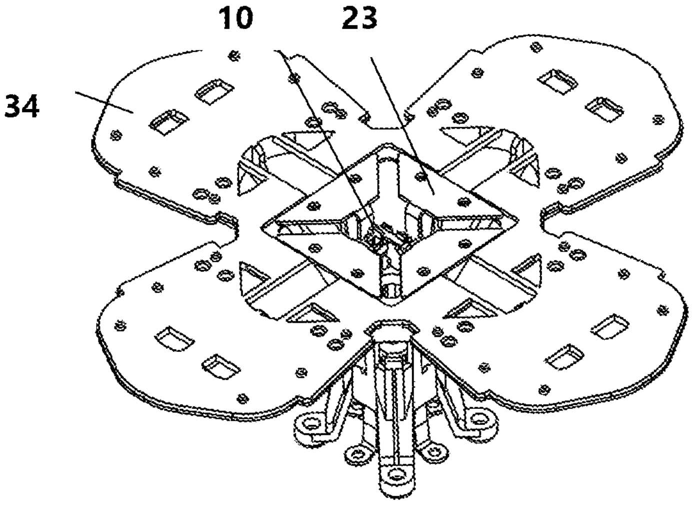
FIGS. 7A-7E show schematic views of a process for assembling the low frequency band radiating element of FIG. 2.

The process of assembling the low frequency band radiating element 3 according to the first embodiment of the present disclosure will be described below with reference to FIGS. 7A-7E, where the support structure 30 has been fixed to the PCB 14 by screws in advance. First, the four dipole legs 23 of the two low frequency dipoles 20 are spaced apart by 90 degrees around the center feed 10, and the legs 23A of the four dipole legs 23 abut against the four outer side walls of the securing blocks 12 of the center feeder 10 respectively. The dipole leg 23 and the center feed 10 are placed together in the central through hole of the support structure 30 until the coupling portions 23B of the four dipole legs 23 rest in the sink portion 34B of the support arm 34 of the support structure 30, as shown in FIG. 7A.

Figure 7B:
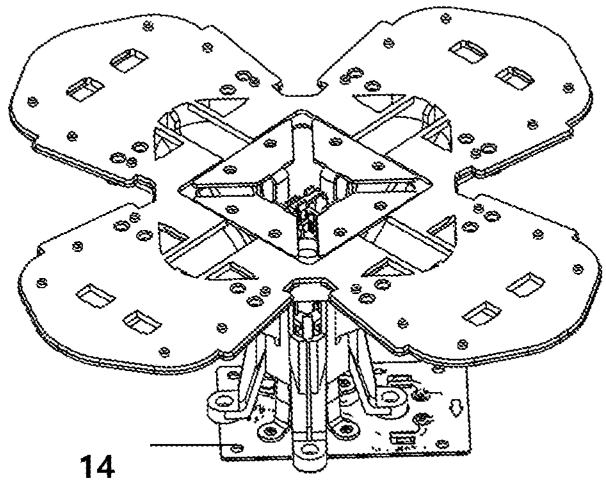

The grounded portions 23C of the four dipole legs 23 and the metal feed line 11 of the center feed 10 are soldered to the PCB 14, as shown in FIG. 7B.

Figure 7C:
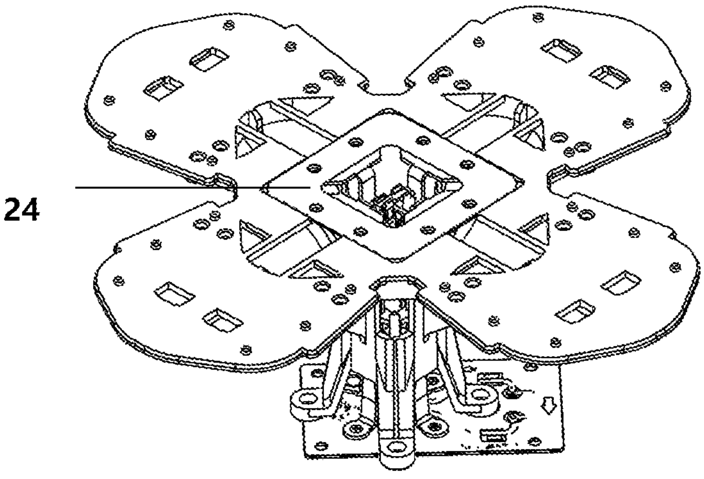
Figure 7D:
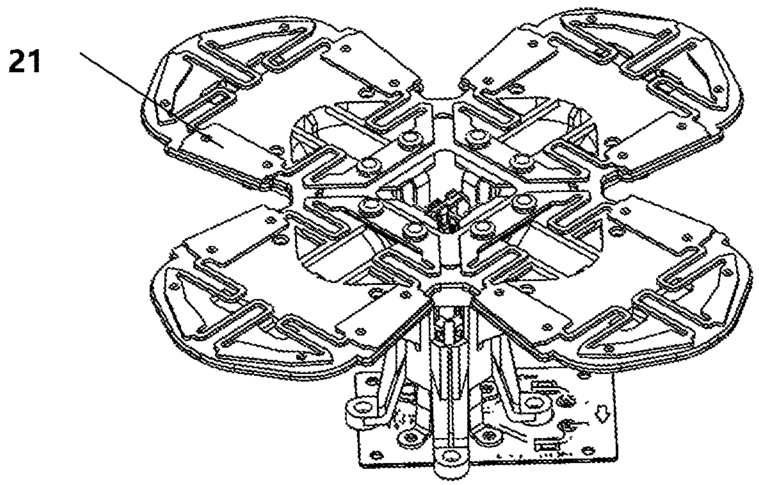
Figure 7E:
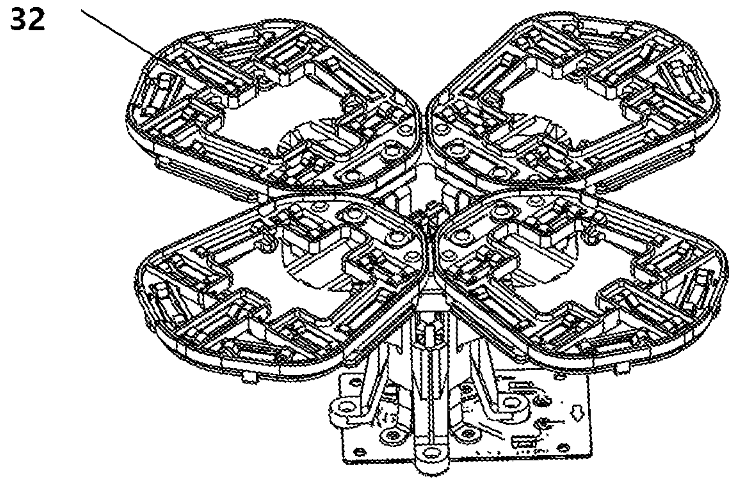

The four sides of the dielectric spacer 24 are placed into the four sink portions 34B of the support 31 respectively, and are flatly attached to the coupling portions 23B of the four dipole legs 23, as shown in FIG. 7C.

The four dipole arms 21 are placed into the receiving portions 34A of the four support arms 34 respectively, and the coupling portions 21A of the dipole arms 21 are placed on the dielectric pad 24 and are flatly attached to the dielectric spacer 24. The rivets are passed through the through holes in the coupling portions 21B of the dipole arms 21, the through holes in the dielectric spacer 24, and the through holes in the coupling portions 23B of the dipole legs 23, and fixedly connected into the holes of the sink portions 34B of the support 31.

The four covers 32 are fixedly connected to the four support arms 34 to ensure that the dipole arms 21 (especially the coupling portions 21B thereof) are flatly attached to the coupling portions 23B of the respective dipole legs 23.

Figure 8A:
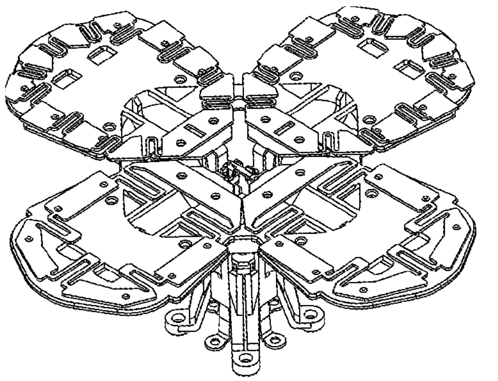
FIGS. 8A-8C are schematic views showing low frequency band radiating elements according to embodiments of the present disclosure having various combinations of radiating portions.
Figure 8B:
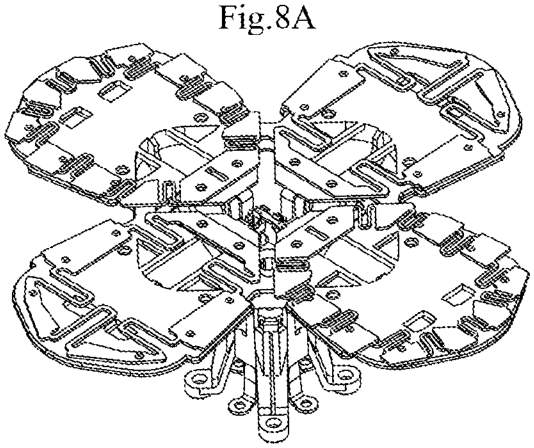
Figure 8C:
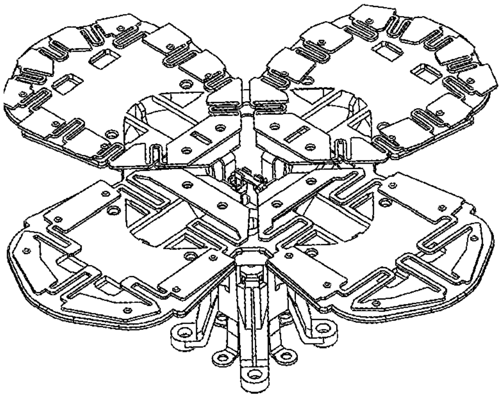

It should be understood that, the patterns of the radiating portions 21A of the dipole arms 21 of the low frequency dipoles 20 may be the same as or different from each other. FIGS. 8A-8C show combinations of various radiating portions 21A in a low frequency band radiating element 3. FIGS. 8A and 8B show a combination of two different radiating portions 21A (indicated by codes A and B), in clockwise orders of AABB and ABAB respectively. FIG. 8C shows a combination of four different radiating portions 21A (indicated by codes A, B, C, and D), in a clockwise order of ABCD respectively.

Figure 9:
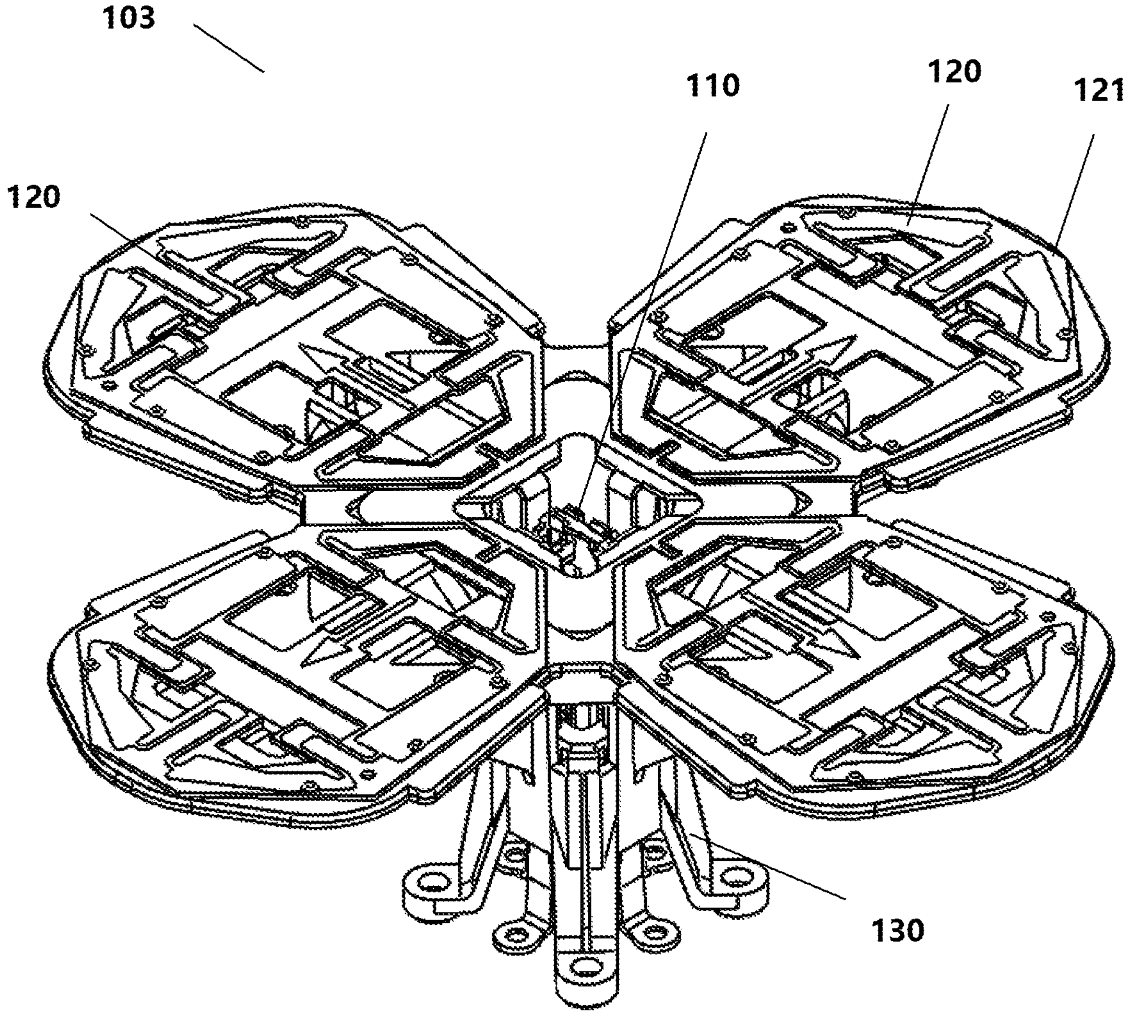
FIG. 9 shows a perspective view of a low frequency band radiating element according to a second embodiment of the present disclosure.
Figure 10:
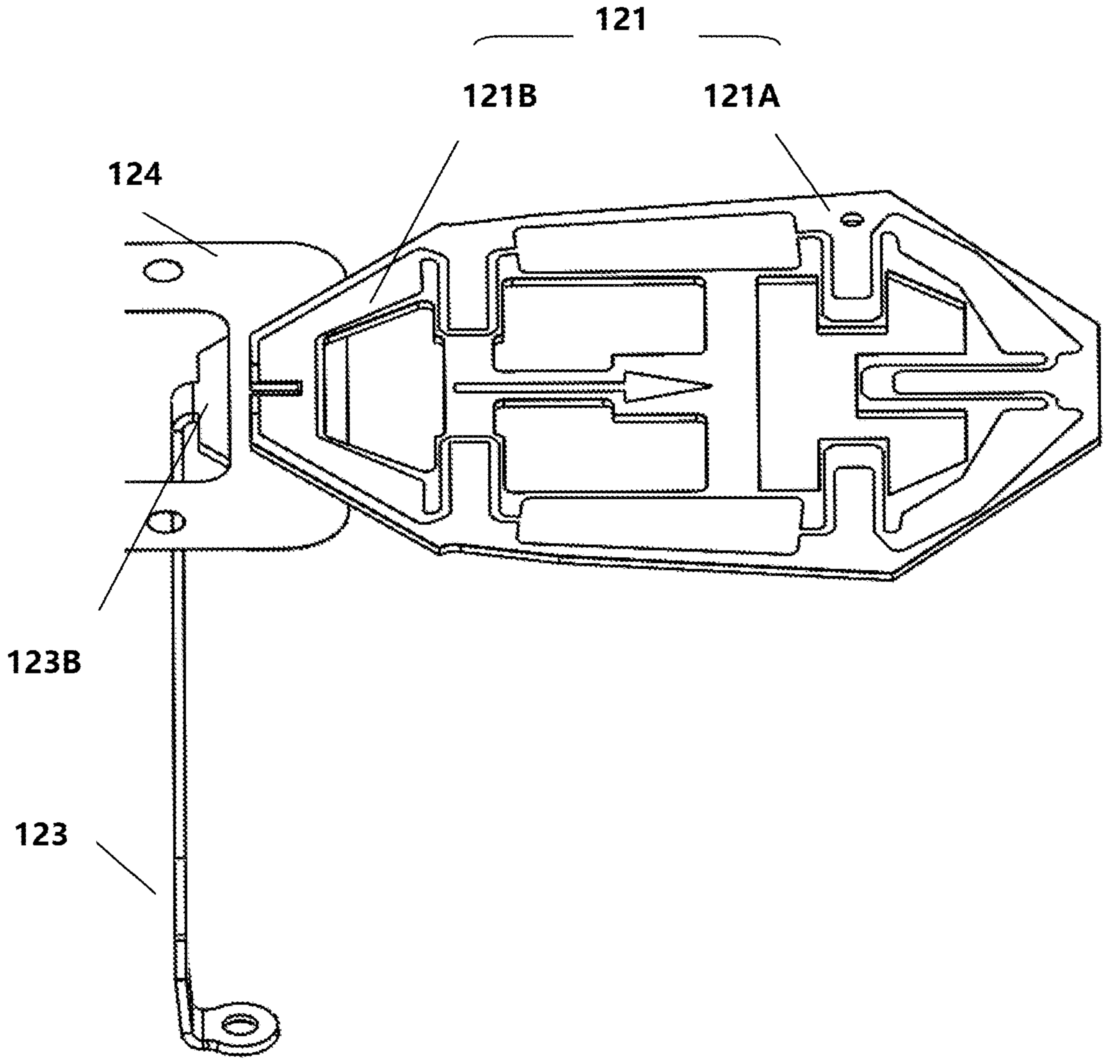
FIG. 10 shows a perspective view of a dipole arm and a dipole leg of the low frequency band radiating element of FIG. 9.

FIG. 9 is a perspective view of a low frequency band radiating element 103 according to a second embodiment of the present disclosure. The low frequency band radiating element 103 in which 100 is added to the reference sign in the low frequency band radiating element 3 indicates the same or similar structure.

As shown, the low frequency band radiating element 103 may include a center feed line 110 and two low frequency dipoles 120. The two low frequency dipoles 120 surround the center feed line 110, and are orthogonal to each other. The low frequency band radiating element 103 may further include a support structure 130 for supporting the center feed line 110 and the two low frequency dipoles 120. The support structure 130 surrounds the center feed line 110, and supports the center feed line 110 and the two low frequency dipoles 120 on the PCB above the reflector 102. The structure of the center feed line 110 is similar to that of the center feed 10, and thus description will be omitted here.

Each low frequency dipole 120 includes two dipole arms 121. Each dipole arm 121 has a corresponding dipole leg 123 that is formed separately, and the dipole arm 121 and the corresponding dipole leg 123 may be connected together in a removable manner. The structure of the dipole leg 123 is similar to that of the dipole leg 23, and thus description will be omitted here.

Each dipole arm 121 extends substantially parallel to the PCB above the reflector 102, and is at a certain height from the PCB above the reflector 102. Each dipole arm 121 has a substantially flat plate shape, and is made from a PCB. Each dipole arm 121 includes a radiating portion 121A and a coupling portion 121B that are connected to each other. The radiating portion 121A is used for electromagnetic radiating in the working frequency bands and for spatial wave transmission. The coupling portion 121B is located radially inward of the radiating portion 121A, and configured to removably connect the radiating portion 121A to the coupling portion 123B of the corresponding dipole leg 123. The cross-sectional shapes of the coupling portion 121B and the coupling portion 123B may substantially correspond to each other, and may be, for example, trapezoidal, rectangular, triangular, semicircular, or any other suitable shape. The coupling portion 121B and the coupling portion 123B are provided with a plurality of through holes (e.g., two) corresponding in position for receiving rivets therethrough, thereby fixedly (but removably) connecting the coupling portion 121B to the coupling portion 123B. As the PCB of the dipole arm 121 is insulated, no additional dielectric spacer (such as the dielectric spacer 24 of low frequency band radiating element 3) is necessary when the coupling portion 121B is connected to the coupling portion 123B. In other embodiments, the coupling portion 121B and the coupling portion 123B may be connected by other connection means, such as screw connection, snap-fit connection, and shape fit.

Figure 11A:
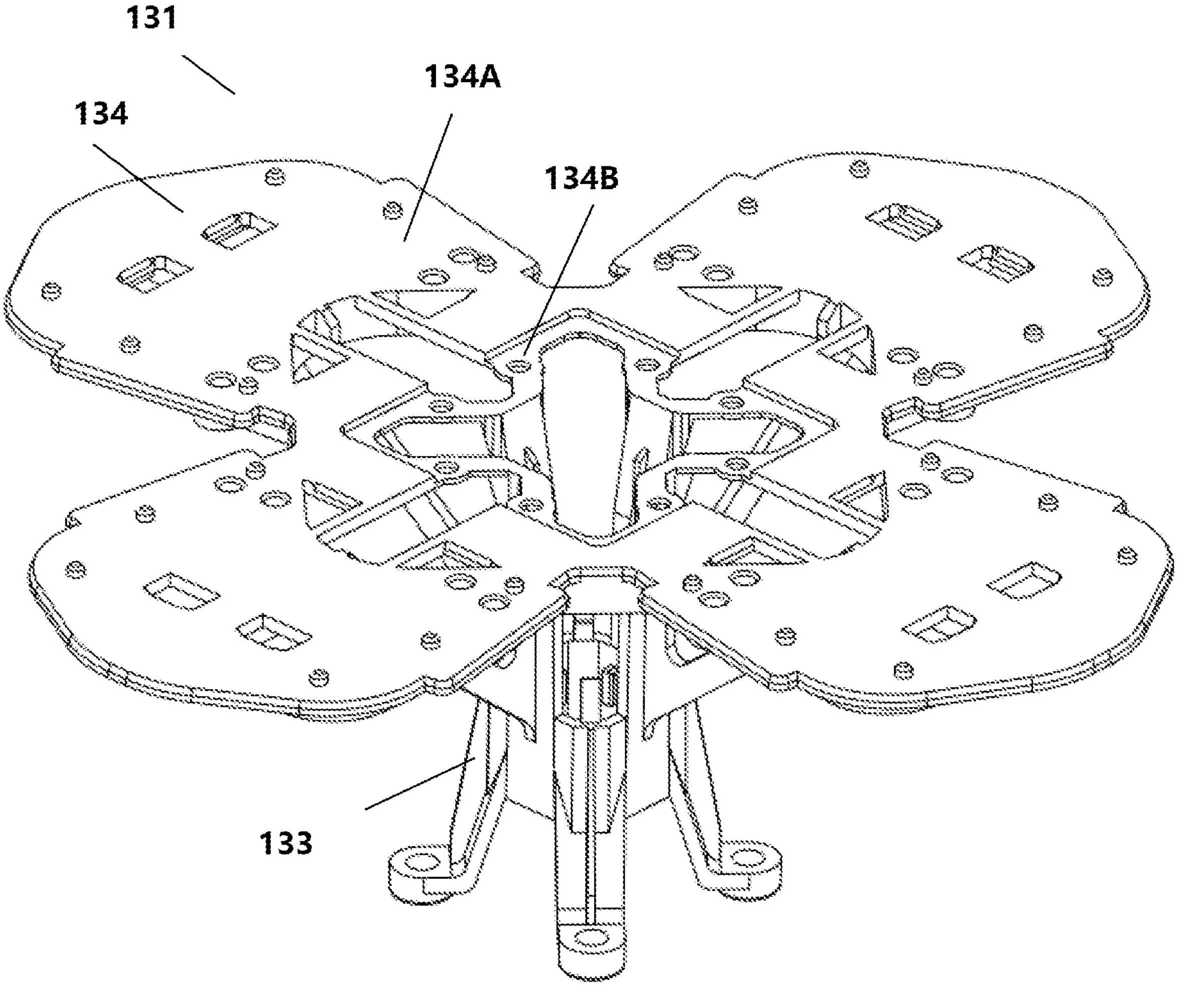
FIGS. 11A-11B show perspective views of a support and a cover of the low frequency band radiating element of FIG. 9.
Figure 11B:
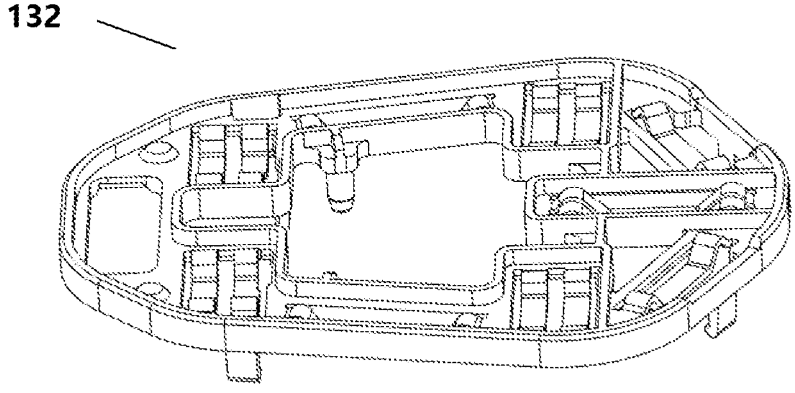

As shown in FIGS. 11A and 11B, the support structure 130 includes a support 131 and covers 132 that are formed separately. The support 131 is configured to support the center feed line 110 as well as the dipole arms 121 and the dipole legs 123. The support 131 includes four support legs 133 and four support arms 134 arranged around a central through hole thereof. Each support leg 133 is connected to a respective one of the support arms 134, and the four support legs 133 and the support arms 134 connected thereto are spaced apart by 90 degrees around the central through hole. The structure of the support leg 133 is similar to that of the support leg 33, and thus description thereof will be omitted here.

Each support arm 134 is configured to hold a corresponding one of the dipole arms 121 in place and to connect the dipole arm 121 to its corresponding dipole leg 123. Each support arm 134 is disposed at the top end of its corresponding support leg 133, and protrudes radially outward from the support leg 133 substantially perpendicular to the support leg 133. Each support arm 134 may have a substantially plate-like shape. Each support arm 134 is provided with a receiving portion 134A for receiving the radiating portion 121A of its corresponding dipole arm 121. The contour shape of the receiving portion 134A substantially corresponds to and is slightly larger than the outer contour shape of the radiating portion 121A of the dipole arm 121. The support arm 134 is provided on a radially inner side of the receiving portion 134A with a sink portion 134B recessed inward from the bottom surface of the receiving portion 134A for receiving the coupling portion 123B of a respective one of the dipole legs 123. The coupling portion 121B of the dipole arm 121 may be placed on the coupling portion 123B of the dipole leg 123, and the depth of the sink portion 134B may substantially correspond to the thickness of the coupling portion 121B of the dipole leg 123, so that the coupling portion 123B of the dipole leg 123 and the coupling portion 121B of the dipole arm 121 are coupled in a flatly attached manner after the coupling portion 123B of the dipole leg 123 is placed into the sinking part 134B and the dipole arm 121 is placed into the receiving portion 134A, and the radiating portion 121A and the coupling portion 122B are on the same plane to prevent a bend between the radiating portion 121A and the coupling portion 121B. The sink portion 134B is provided with holes for receiving the rivets.

The covers 132 are placed on the respective support arms 134, and cover the receiving portions 134A and the sink portion 134B of the respective support arms 134. Each cover 132 is configured to protect its corresponding dipole arm 121 from external damage and ensure that the dipole arm 121 (especially the coupling portion 121B thereof) is flatly attached to the coupling portion 123B of its corresponding dipole leg 123. The outer contour shape of the covers 132 substantially corresponds to the shapes of the support arms 134. The covers 132 may be removably fixed to the respective support arms 134 by snap-fitting or the like.

In the second embodiment, the dipole arms 121 are formed using a PCB instead of from stamped sheet metal as in the first embodiment. The dipole arms 121 made from a PCB have high mechanical strength, and thus the support arms 133 of the support structure 130 may be smaller than the support arm 33 of the support structure 30.

Figure 12:
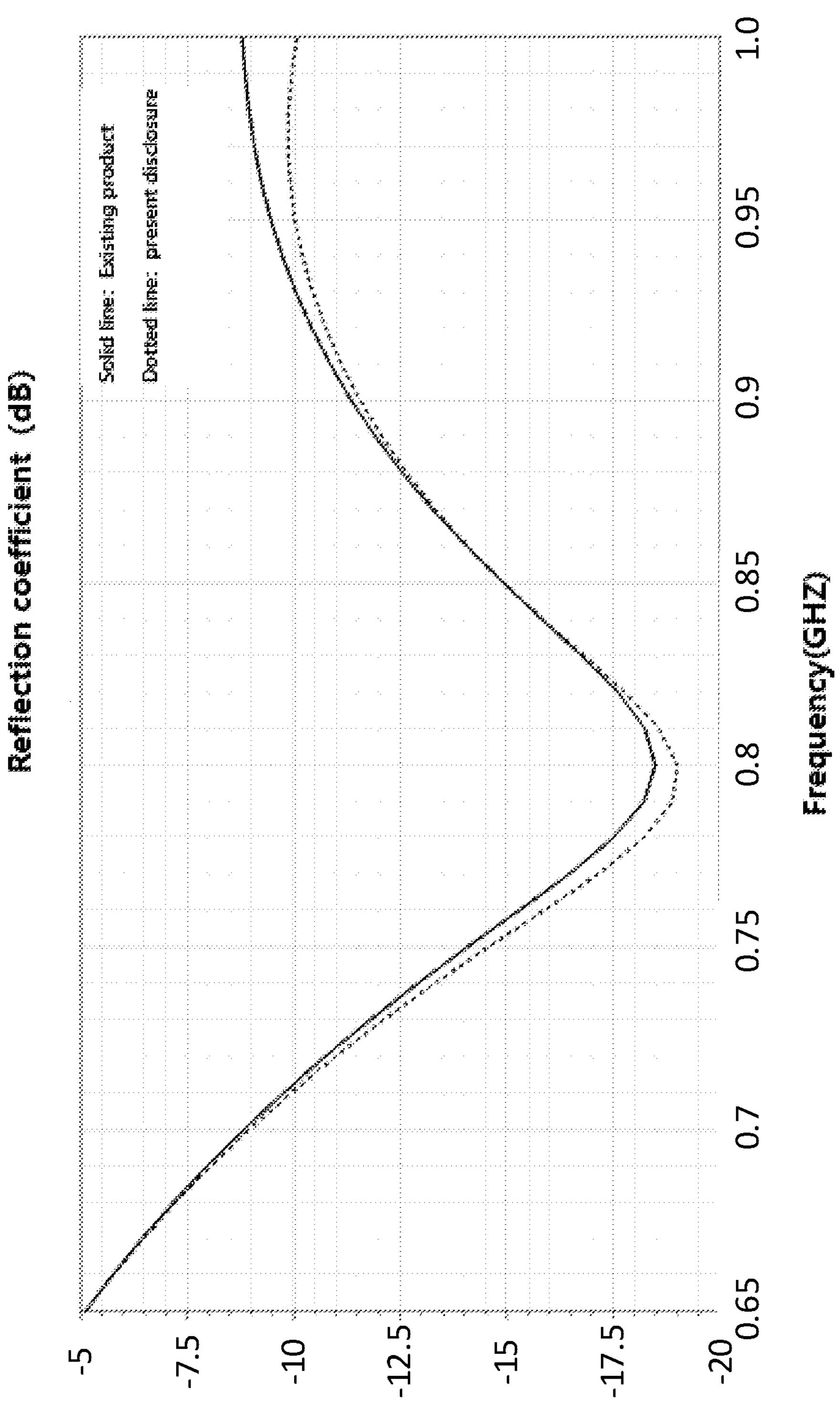
FIG. 12 is a graph of the reflection coefficient as a function of frequency for both a conventional low frequency band radiating element and a low frequency band radiating element according to an embodiment of the present disclosure.

FIG. 12 shows a comparison of measured values of reflection coefficient of a low frequency band radiating element made according to embodiments of the present disclosure and an existing low frequency band radiating element. As may be seen from the drawings, in the case where the coupling portion of the dipole arm is spaced apart from the coupling portion of the dipole leg at a small distance and with a large overlap area, a measured value of reflection coefficient similar to that of the existing low frequency band radiating element may be obtained for the low frequency band radiating element made according to embodiments of the present disclosure.

The separate design of the low frequency dipole according to embodiments of the present disclosure can simplify the stamping process. By using a thinner metal sheet for the dipole arm, it is possible to improve the cutting quality of the edge area of the dipole arm and reduce a potential PIM problem.

A thin metal sheet with a suitable electrical performance can be selected for the dipole arm according to embodiments of the present disclosure. The thin metal sheet is easily machined into a plurality of thin metal strips, and easily machined into a densely curved pattern of the dipole arm. A thick metal plate can be selected for a dipole leg so as to achieve mechanical strength.

The low frequency dipoles according to embodiments of the present disclosure are easy to assemble and to replace, and are suitable for automatic soldering. The dipole arms may be replaced individually by simply removing the rivets without removing the entire low frequency dipole and center feed and performing soldering again.

Although the exemplary embodiments of the present disclosure have been described, a person skilled in the art should understand that, he or she may make multiple changes and modifications to the exemplary embodiments of the present disclosure without substantively departing from the spirit and scope of the present disclosure. Accordingly, all the changes and modifications are encompassed within the protection scope of the present disclosure as defined by the claims. The present disclosure is defined by the appended claims, and the equivalents of these claims are also contained therein.

That which is claimed is:

1. A low frequency band radiating element for a multiple frequency band cellular base station antenna, comprising:

a first dipole arm including a first radiating portion and a first dipole arm coupling portion;

a first dipole leg that includes a first grounding portion that is configured to be grounded, a first leg and a first dipole leg coupling portion located at one end of the first dipole leg;

a second dipole arm that is separate from the first dipole arm, the second dipole arm including a second radiating portion and a second dipole arm coupling portion;

a second dipole leg that includes a second grounding portion that is configured to be grounded, a second leg and a second dipole leg coupling portion located at one end of the second dipole leg; and a dielectric spacer interposed between the first dipole arm coupling portion and the first dipole leg coupling portion, wherein the first dipole arm coupling portion is removably connected to the first dipole leg coupling portion, wherein the second dipole arm coupling portion is removably connected to the second dipole leg coupling portion, wherein the first dipole arm is a stamped sheet metal dipole arm and the first dipole leg is a stamped sheet metal dipole leg, and the first dipole leg has a first thickness and the first dipole arm has a second thickness that is less than the first thickness.

2. The low frequency band radiating element according to claim 1, wherein the first dipole leg has a thickness of 0.8 mm to 1.2 mm and the first dipole arm has a thickness of 0.3 mm to 0.6 mm.

3. The low frequency band radiating element according to claim 1, wherein the first dipole leg coupling portion protrudes radially outward from the one end of the first dipole leg.

4. The low frequency band radiating element according to claim 1, wherein the first dipole arm coupling portion is connected to the first dipole leg coupling portion by rivets.

5. The low frequency band radiating element according to claim 1, further comprising:

a first feed line and a second feed line, wherein the first feed line includes a first forwardly extending portion, a second rearwardly extending portion and a connecting portion that connects the first forwardly extending portion to the second rearwardly extending portion.

* * * * *